United States Patent [19]
Muchnik

[11] Patent Number: 5,237,548
[45] Date of Patent: Aug. 17, 1993

[54] MAGNETO-OPTIC RECORDING STRUCTURE AND METHOD

[75] Inventor: Boris J. Muchnik, Boulder, Colo.

[73] Assignee: Hoechst Aktiengesellschaft, Frankfurt am Main, Fed. Rep. of Germany

[21] Appl. No.: 860,247

[22] Filed: Mar. 27, 1992

Related U.S. Application Data

[63] Continuation of Ser. No. 688,386, Apr. 22, 1991, abandoned, which is a continuation of Ser. No. 200,926, Jun. 1, 1988, abandoned.

[51] Int. Cl.$^5$ .................... G11B 13/04; G11B 11/12; G11B 11/10
[52] U.S. Cl. .................. 369/13; 360/59; 360/114
[58] Field of Search ............ 369/13, 284, 286, 288; 360/59, 114; 365/122

[56] References Cited

U.S. PATENT DOCUMENTS

| | | | |
|---|---|---|---|
| 4,287,544 | 9/1981 | Lazzari | 360/131 |
| 4,390,600 | 6/1983 | Ohta et al. | 428/621 |
| 4,466,035 | 8/1984 | Connell et al. | 360/114 |
| 4,569,881 | 2/1986 | Freese et al. | 428/213 |
| 4,633,338 | 12/1986 | Sato et al. | 360/59 |
| 4,649,519 | 3/1987 | Sun et al. | 365/122 |
| 4,694,358 | 9/1987 | Muchnik et al. | 360/59 |
| 4,914,643 | 4/1990 | Maeda | 369/13 |
| 5,051,970 | 9/1991 | Ishii et al. | 365/122 |

FOREIGN PATENT DOCUMENTS

| | | | |
|---|---|---|---|
| 0051296 | 5/1982 | European Pat. Off. | |
| 58-108045 | 6/1983 | Japan | 369/13 |
| 60-119648 | 6/1985 | Japan | 369/13 |
| 60-119649 | 6/1985 | Japan | 369/13 |
| 61-214258 | 9/1986 | Japan | 360/114 |

OTHER PUBLICATIONS

"Properties of Metals as Conductors," CRC Handbook of Chemistry and Physics, 62nd ED., p. E-82.
Marchant, "Retardation Effects in Magneto-Optic Readout," Proc. SPIE, 695, 1986 pp. 270-276.
Yoshizawa et al., "Analyses of Optical Anisotropy of PC Substrate for M-O Disc and Its Effect on CNR," Proc. SPIE, 695, 1986, pp. 91-98.
Howard, "Thin Films for Magnetic Recording Technology; A Review," J. Vac. Sci. Technol. 4(1), 1986, pp. 1-13.
Takahashi et al., "High Quality Magneto-Optical Disk," PROC. IEEE, 695, 1986, pp. 65-71.
Jackson, "Plane Electromagnetic Waves," Classical Electrodynamics, Wiley, 1962, p. 225.
Mallinson et al., "A Theoretical and Experimental Comparison of the Longitudinal and Vertical Modes of Magnetic Recording," IEEE Transactions on Magnetics, vol. Mag-20, No. 3, May 1984, 461-467.
Wheeler et al., "Web-based Optical Disk Assemblies," Proc. SPIE 420, 1983, pp. 39-52.
Terao et al., "Resistance to Oxidation of Te-Se Optical Recording Films," Proc. SPIE, 382, 1983, pp. 276-281.

Primary Examiner—Hoa T. Nguyen
Attorney, Agent, or Firm—Foley & Lardner

[57] ABSTRACT

A magneto-optic recording structure is disclosed in which the magnetic recording layer is sandwiched between an opaque substrate and a magneto-optic layer structure. The magneto-optic recording structure comprises a substrate, a magnetic recording layer coated on the substrate and a magneto-optic layer structure coated on the magnetic recording layer. The arrangement of layers permits both the magnetic and magneto-optic layers to be addressed from the same side. The magnetic recording layer and the magneto-optic layer structure can be coated on both sides of the substrate, to make double-sided disks. The recording structure also allows the use of opaque substrates. An information recording and playback device based on the magneto-optic recording structure comprises a magnetic recording head disposed adjacent the magneto-optic layer adjacent the magneto-optic layer structure for recording and reading the magneto-optic active layer. A method for recording data on the magneto-optic layer. A method for recording data on the magneto-optic recording structure comprises the steps of recording data in the magnetic recording layer through the magneto-optic layer structure to produce a fringing magnetic field and then locally irradiating an area of the magneto-optic layer structure to raise the temperature of the area so that the area aligns itself with the fringing magnetic field.

10 Claims, 3 Drawing Sheets

MAGNETO-OPTIC RECORDING STRUCTURE AND METHOD

This application is a continuation of application Ser. No. 07/688,386, filed Apr. 22, 1991, now abandoned, which in turn is a continuation of application Ser. No. 07/200,926, filed Jun. 1, 1988, now abandoned.

BACKGROUND OF THE INVENTION

The present invention relates to a magneto-optic recording structure comprising both magnetic and magneto-optic layers and more particularly to such a structure in which both the magnetic and magneto-optic heads record from the same side of the structure, allowing a double-sided disk structure.

U.S. Pat. No. 4,694,358, assigned to the assignee of the present invention, discloses a recording medium comprising both a magnetic recording layer, to be written on conventionally by means of a conventional magnetic recording head, and a magneto-optic layer, to which the magnetically written information can be thermomagnetically transferred by the passage of a focussed laser beam. This magneto-optic recording structure overcomes the writeover problem of magneto-optic recording by avoiding the typical delay of one revolution of the disk for an erase pass prior to a write pass. The structure therefore achieves the high track density associated with optical recording while eliminating the writeover problem.

In U.S. Pat. No. 4,694,358, the contents of which are hereby incorporated by reference, a magneto-optic layer (or layer structure) is sandwiched between a transparent substrate and a magnetic recording layer. A magnetic head adjacent the magnetic layer is used to record data in the magnetic layer and a focussed laser beam disposed adjacent the transparent substrate is used to read and record the magneto-optic layer. Thus, the MO layer is addressed by the laser beam through the substrate to cause thermomagnetic transfer of information from the magnetic layer to the magneto-optic layer or structure, or to cause (at reduced laser power) the readout of information by means of the polar Kerr effect.

Although such a structure eliminates the writeover problem, it does not allow the use of improved substrates such as aluminum which are opaque or the use of double-sided disks. In order to use an opaque substrate or make a double-sided disk, the laser beam and the magnetic head would both have to be on the same side of the substrate. However, because a laser beam cannot penetrate an opaque substrate or a conventional magnetic layer, the magnetic layer would have to be sandwiched between the substrate and the magneto-optic layer structure.

Conventional wisdom teaches against such an arrangement. The flying height and the distance to the magnetic recording layer must be very small, i.e., a fraction of a micrometer or a few microinches, particularly at high density. Therefore, intervening layers of materials of any kind are detrimental to resolution. According to an article by Mallinson et al (1984) *IEEE Transactions on Magnetics*, MAG-20(3): 461-467, the contents of which are hereby incorporated by reference, there is a well-known reproducible spacing loss law of 55 decibels (a factor of five hundred) per wavelength of spacing between the head and the magnetic recording medium. This spacing loss applies to both vertical and longitudinal magnetic recording media. Although the spacing loss discussed by Mallinson refers to "reproduction" or magnetic playback of magnetically recorded signals, it is clear from the fundamental physics of magnetic recording that similar spacing losses must apply to magnetic recording as well as playback. In a recording mode, the degradation would result in increased noise or peak shift, rather than reduced signal.

SUMMARY OF THE INVENTION

It is therefore an object of the present invention to provide a means of achieving both the high track density associated with optical recording and the rapid access times associated with conventional magnetic recording while using an opaque substrate or a substrate for which optical transmission parameters are not important.

It is a further object of the invention to provide both the high track density associated with optical recording and the rapid access times associated with conventional magnetic recording on a double-sided disk, thereby doubling the information storage capacity over single-sided disks.

Surprisingly, it has been found that the objects of the invention can be achieved by a structure in which the magnetic recording layer is sandwiched between an opaque substrate and a magneto-optic layer structure. The magneto-optic recording structure comprises a substrate, a magnetic recording layer coated on the substrate and a magneto-optic layer structure coated on the magnetic recording layer. The magnetic recording layer and the magneto-optic layer structure can be coated on both sides of the substrate, to make double-sided disks. The recording structure also allows the use of opaque substrates.

The objects of the invention are also achieved by an information recording and playback device comprising the above-described magneto-optic recording structure, a magnetic recording head incident upon the magneto-optic layer structure for recording information in the magnetic recording layer and a focussed laser beam disposed adjacent the magneto-optic layer structure for recording and reading the magneto-optic active layer. A method for recording data on the magneto-optic recording structure comprises the steps of recording data in the magnetic recording layer through the magneto-optic layer structure, wherein the data causes a fringing magnetic field and locally irradiating an area of the magneto-optic layer structure to raise the temperature of the area to a temperature sufficient to permit the area to align itself with the fringing magnetic field.

DETAILED DESCRIPTION OF THE PREFERRED EMBODIMENTS

Figure 1:
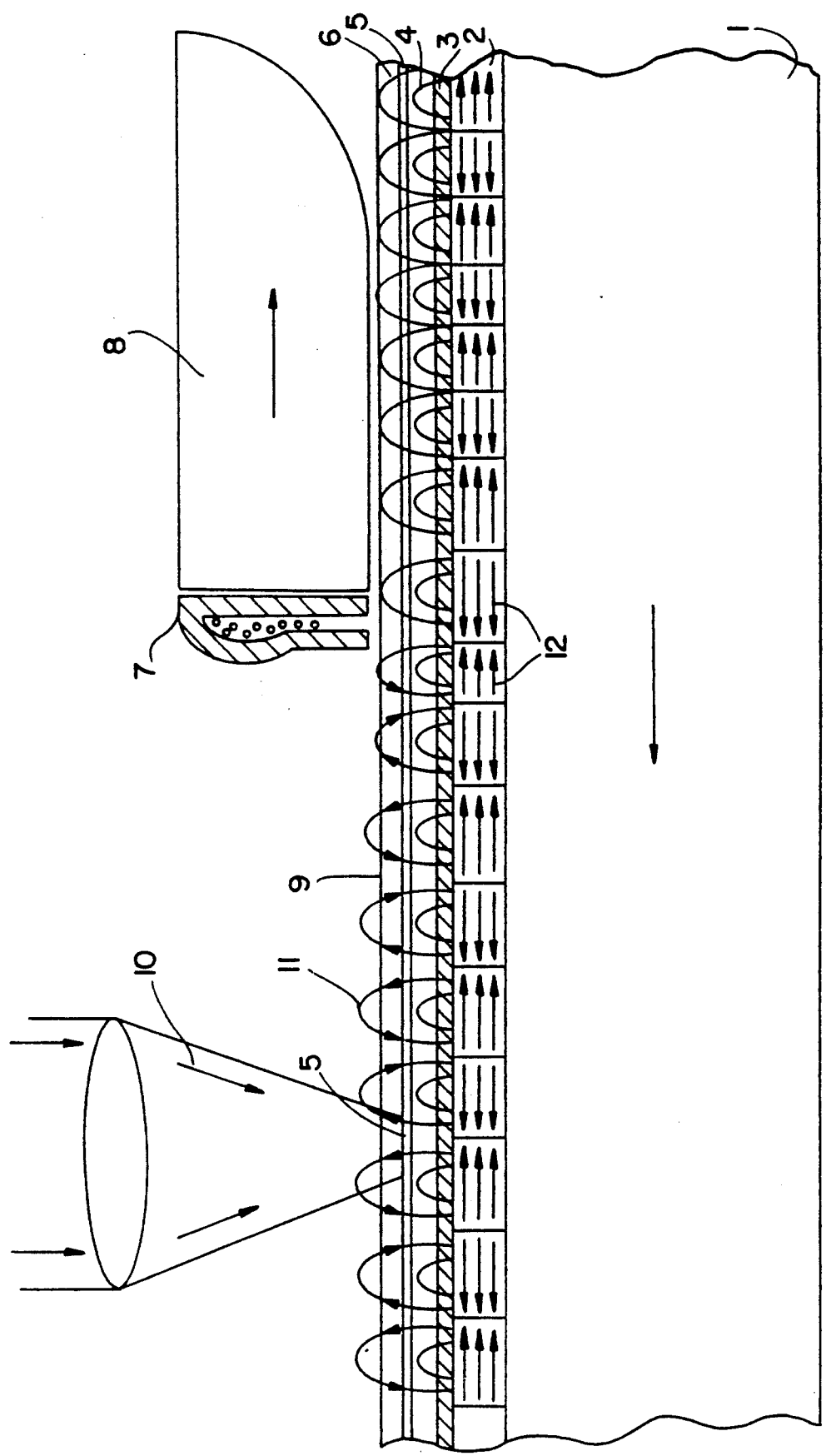
FIG. 1 is a schematic illustrating the arrangement of layers and recording heads according to an embodiment having a magnetic layer adapted for longitudinal recording.
Figure 2:
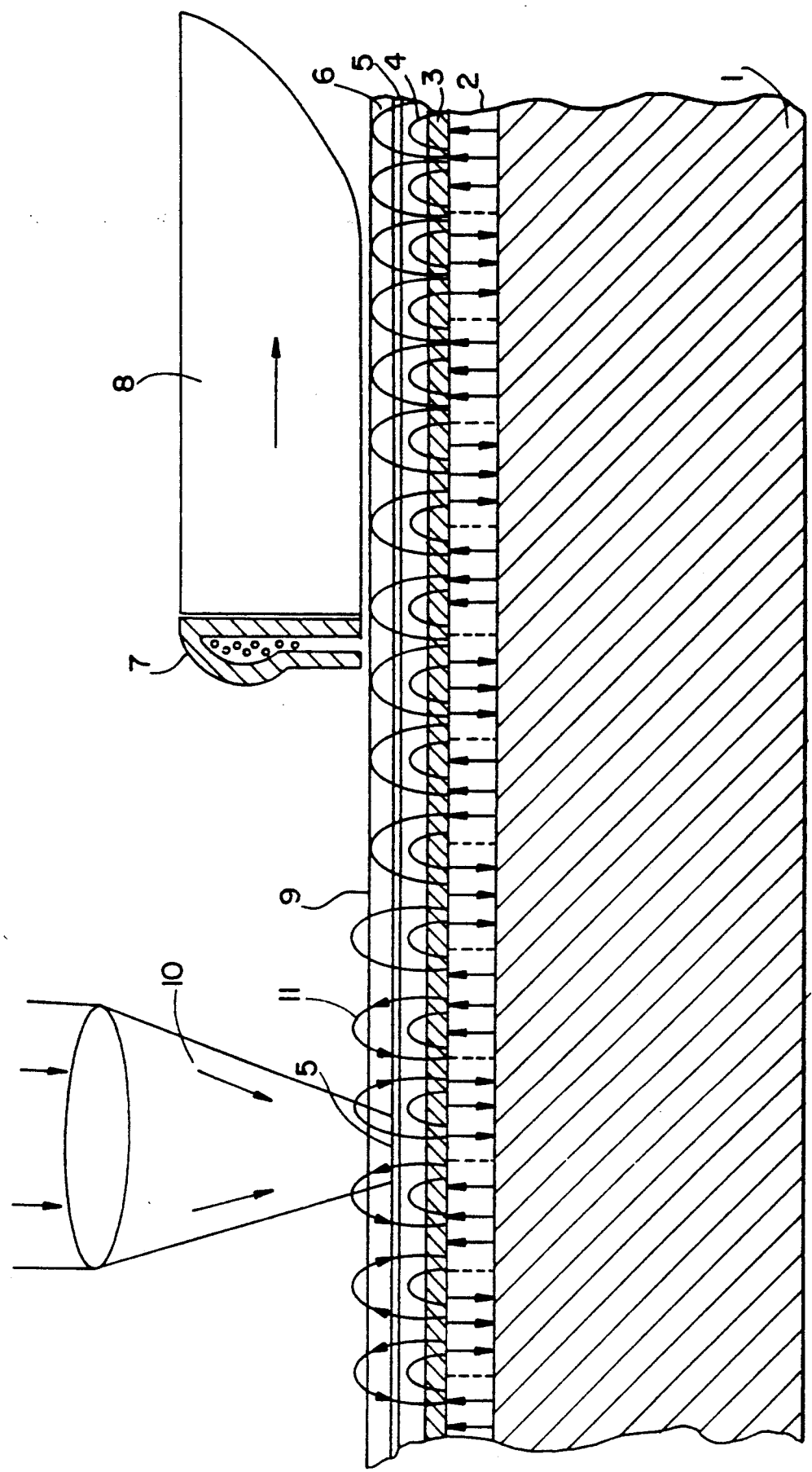
FIG. 2 is a schematic illustrating the arrangement of layer and recording heads according to an embodiment having a magnetic layer adapted for vertical recording.
Figure 3:
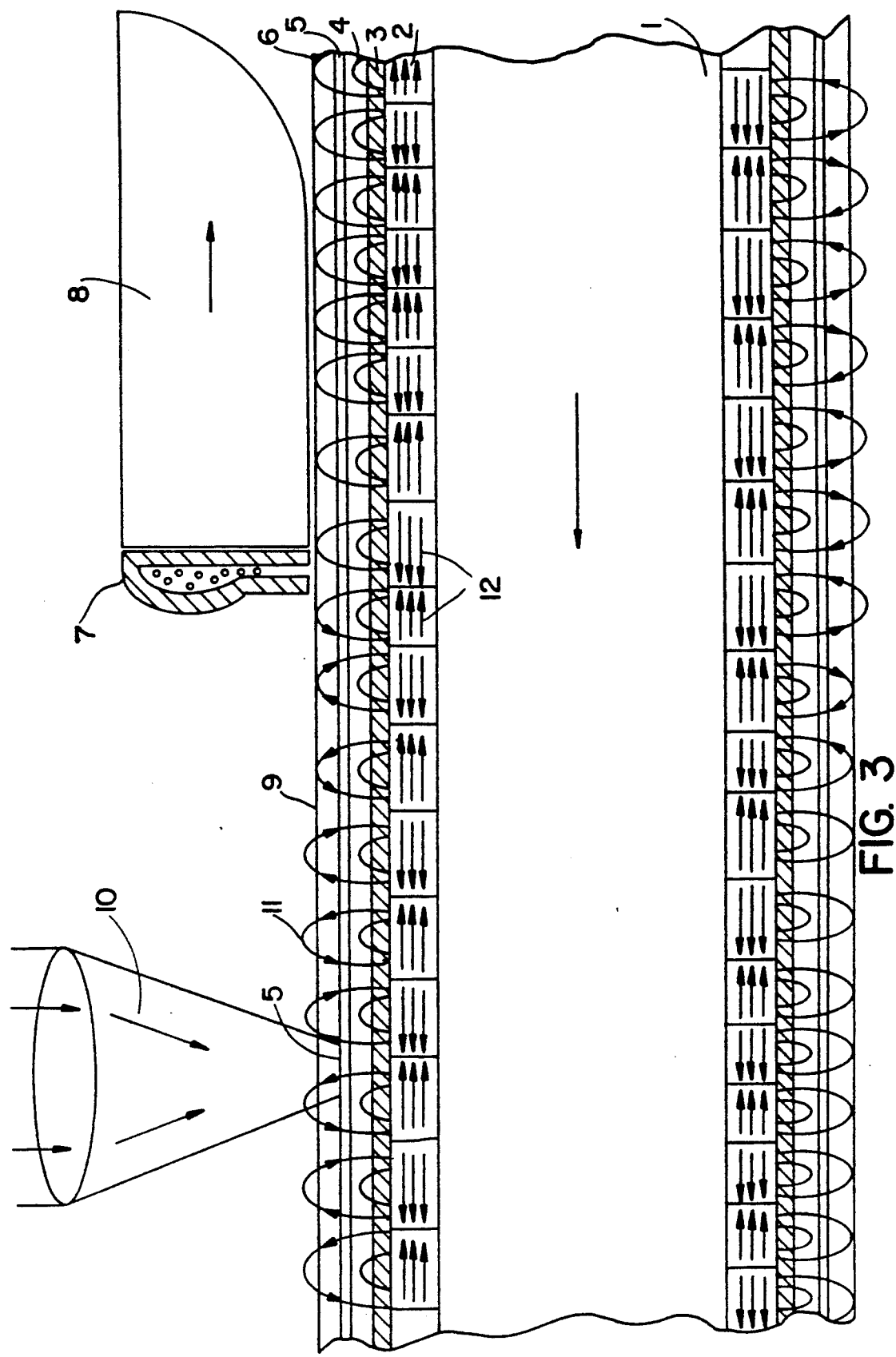
FIG. 3 is a schematic illustrating a double-sided recording medium according to the present invention.

The magneto-optic recording structure according to the present invention is shown in FIG. 1. Magnetic layer 2 overlies substrate 1 and a magneto-optic layer structure overlies magnetic layer 2, as shown in FIGS. 1 and 2. The magneto-optic layer structure shown in FIG. 1 is a quadrilayer structure, although other arrangements of the magneto-optic layer are possible, and magnetic layer 2 is adapted for longitudinal recording. Because magnetic layer 2 is opaque, the magneto-optic layer structure must be outermost, i.e., most remote from the substrate. The magnetic layer shown in FIG. 2 is adapted for longitudinal recording, and the substrate is opaque.

Virtually any substrate with the requisite flatness, smoothness, dimensional stability, and surface quality with respect to defects, inclusions and scratches, can be used in the practice of the present invention. Unlike substrates for conventional magneto-optic recording structure, the substrate need not be transparent. Thus, in addition to plastics such as thermoplastic or thermosetting resins, epoxy, polyamide, polycarbonate and glass, the present invention also permits the use of substrates such as those made of aluminum which have been highly developed for use as magnetic recording substrates over several decades. As densities have increased and flying heights have decreased, magnetic recording technology has demanded ever flatter surfaces with much improved surface finishes and fewer defects. These highly improved substrates are attractive vehicles for high density information recording.

As with optical recording technology in general, some means of providing optical tracking servo information must be incorporated into the disk. In plastic substrates, this is economically accomplished by injection molding grooved substrates. Grooved glass substrates are also available and are made with a combination of photolithographic techniques and etching, including plasma etching.

Aluminum substrates for magnetic recording are normally finished with a flat surface. However, tracking grooves can be incorporated by diamond turning in aluminum substrates of proper alloy quality. Alternatively, a grooved plastic thin sheet can be laminated to an aluminum disk. A lamination with good surface quality is the so-called Kodak "Laminated Disk Assembly" (LDA) described by Wheeler et al (1983) *Proc. SPIE* 420: 39 (the contents of which are hereby incorporated by reference). Although the Kodak LDA was not grooved for tracking, similar films could be embossed or molded with grooves and laminated to rigid aluminum substrates.

Another well-known technique for providing grooves to featureless surfaces is the photopolymer technique described, for example, in Terao et al (1983) *Proc. SPIE*, 382: 276. As illustrated, this technique requires a transparent substrate in order to effect an ultraviolet light cure of the photopolymer because the mold used is made of nickel. However, by using a transparent mold, this technique can be applied to aluminum disks.

Disk substrate 1, which may be opaque or transparent is first coated with magnetic recording layer 2, using methods which are well-known in the art. If a double-sided disk is desired, the substrate is coated on both sides with the magnetic layer. A preferred method of coating is in-line sputtering. Suitable production sputtering equipment is available from various sources such as Leybold-Heraeus and Balzers.

Magnetic recording layer 2 may be any material having either vertical or longitudinal anisotropy which can be recorded by a conventional magnetic head. The magnetic layer must have an optically smooth surface. Current particulate magnetic media does not satisfy this requirement, although it may be possible to modify certain of these media (e.g., gamma ferric oxide in polymeric binder) to have the requisite smoothness. It is preferred to use thin film magnetic media. Suitable materials are reviewed by Howard in "Thin films for magnetic recording technology: A review" *J. Vac. Sci. Technol.* 4(1), 1–13. A preferred material is chromium/cobalt. The thickness of the magnetic layer is on the order of 150 nm, with a preferred range of about 80 to 300 nm, and the surface of the layer is mirror-smooth.

Following coating of magnetic layer 2, the magneto-optic layer structure is applied. The magneto-optic recording layer structure typically comprises a rare earth-transition metal (RETM) alloy layer sandwiched between dielectric layers, with each layer being about 90 nm thick for a total thickness of about 270 nm. Alternatively, the well-known quadrilayer interference structure can be used for enhanced performance with respect to sensitivity and signal-to-noise ratio. (See, e.g., U.S. Pat. Nos. 4,390,600; 4,466,035; 4,569,881 and Takahashi et al. (1986) *Proc. IEEE*, 695: 65. The quadrilayer comprises reflective layer 3, dielectric spacer layer 4, magneto-optic active layer 5, and dielectric protective layer 6. These quadrilayer structures are typically about 175 nm thick. For example, Takahashi, supra, discloses a 50 nm reflective layer, a 25 nm dielectric spacer layer, a 20 nm magneto-optic active layer, and an 80 nm dielectric protective layer. This thinness is preferable because of spacing losses (see discussion below). As with the magnetic layer, if a double-sided disk is desired, the various layers are coated on both sides. Conventional RETM alloys for the magneto-optic active layer include TbFeCo and GdTbFeCo. Particularly preferred is a film of $Tb_{23}Fe_{67}Co_{10}$. Conventional dielectric layers include silicon nitride, among others. In the quadrilayer structure, the reflective layer can be aluminum or gold.

Information is written by means of thin film ring magnetic head 7 into the magnetic recording layer 2. The magnetic head supported by slider 8 flies in close proximity to the surface of disk 9. Following the passage of magnetic head 7, focussed laser beam 10, incident from the same side of the disk as magnetic head 7, irradiates and locally heats magneto-optic active layer 5, reducing the coercivity of layer 5 and permitting its magnetization to reorient in directions determined by fringing fields 11 resulting from the pattern of magnetization reversals 12 in magnetic layer 2. As the rotating disk moves the heated spot out of the laser beam, it cools with the vertical magnetization locally determined by the fringing field of magnetic layer 2. The information thus recorded in the magneto-optic active layer is retrievable by means of the polar Kerr effect with a focussed laser read beam of reduced power, which can be the same beam 10 on a subsequent revolution of the disk.

According to the present invention, the magneto-optic layer structure is a layer of intervening material between the magnetic layer and the magnetic head. This material is responsible for spacing losses and possibly also for attenuation of the magnetic recording signal due to eddy currents in the magneto-optic layer structure. Magnetic effects such as cross-talk between previously written information in the magneto-optic active layer can also degrade a magnetically recorded signal represented as a pattern of flux reversals in the magnetic layer.

The spacing loss law referred to in Mallinson can be used to calculate the degradation due to additional head spacing associated with the magneto-optic structure. Magneto-optic recording using diode lasers is currently accomplished with minimum alongtrack mark lengths of 1 to 1.5 micrometers, i.e., spatial wavelengths of 2 to 3 micrometers. The thickness is that of the magneto-optic layer structure, i.e., 270 nm for a typical magneto-optic layer structure and 175 nm for a quadrilayer structure. The results are shown in Table 1.

TABLE 1

| Thickness MO Structure | Spacing Loss (dB) Wavelength | | |
|---|---|---|---|
| | 2.0 m (25,400 FRPI) | 2.5 m (20,300 FRPI) | 3.0 m (16,900 FRPI) |
| 175 nm (quadrilayer) | 4.81 | 3.85 | 3.21 |
| 225 nm | 6.19 | 4.95 | 4.13 |
| 270 nm (Std.3-layer) | 7.43 | 5.94 | 4.95 |

With respect to eddy current attenuation of the recording signal, it has been found that this attenuation is negligible compared to spacing losses for signal frequencies of interest in magnetic or optical recording at the present time. The amount of eddy current attenuation depends on the skin depth. Radio frequency electromagnetic fields are attenuated to 1/e by propagation through a conducting medium a distance called the skin depth.

According to standard textbooks, the skin depth is given by $$\delta = \frac{c}{\sqrt{2\pi\mu\omega\sigma}}$$

(See, e.g., Jackson, *Classical Electrodynamics*, Wiley, 1962, p. 225.) In this expression (in Gaussian units), c is the velocity of light, $\mu$ is the permeability, $\omega$ is the angular frequency and $\sigma$ is the conductivity.

The skin depth of the magneto-optic alloys can be approximated by using the resistivity values established for iron and copper (e.g., *CRC Handbook of Chemistry and Physics*, 62nd Ed., p. E-82) and the skin depth established for copper. For copper at 100 MHz, the skin depth is about $0.71 \times 10^{-3}$ cm. The conductivity of iron is a factor of 5.8 times lower than that of copper. Presently, the upper limit of frequencies for magnetic or optical recording is about 25 MHz. Therefore, using the expression for the skin depth, the skin depth for magneto-optic alloys is greater than $\sqrt{(4)(5.8)}$ times greater than that of copper at 100 MHz. In other words at the highest frequencies of interest, the skin depth of the magneto-optic alloy is greater than $3.4 \times 10^{-3}$ cm, or 34 micrometers. Since magneto-optic films are typically about 90 nm thick, or about 0.09/34 of a skin depth, the attenuation of the magnetic recording field by eddy currents in the magneto-optic layer structure is less than $\exp(-0.09/34)$ or 0.023 dB, which is negligible with respect to spacing losses of 3 to 7.5 dB.

When quadrilayer magneto-optic structures are used, eddy current losses are also a factor because this structure incorporates a reflective layer, usually of a highly conductive metal such as aluminum, copper, or gold. However, at the recording frequencies of interest, i.e., up to 25 MHz, eddy current attenuation in the reflective layer represents an attenuation of at most 0.06 dB for an assumed 100 nm of copper. For 50 nm of aluminum the eddy current attenuation is only 0.02 dB. These numbers are negligible compared to spacing losses.

Magnetic crosstalk from the magneto-optic layer structure to the magnetic layer is similarly negligible. The magneto-optic active layer is preferably a rare earth-transition metal alloy with anti-ferromagnetic coupling between rare earth and transition metal atomic magnetic moments, having a composition close to compensation. That is, while the magneto-optic active layer is strongly magnetic in the sense that it is a magnetically ordered structure with strongly magnetized subnetworks of spins, the subnetwork magnetizations largely cancel so that there is very little net magnetization or external magnetic field. For this reason, the permeability of this anti-ferromagnetic material is low and very little of the magnetic field from the magnetic recording head is shunted by the magneto-optic layer structure.

Furthermore, the magneto-optic active layer is not altered when fringing magnetic fields from the magnetic head pass through the magneto-optic layer structure to record the magnetic layer because of the high coercivity of the magneto-optic active layer at room temperature. Coercivities of the magneto-optic active layer can be several kilo-oersteds, whereas the magnetic layer is written with fields of a few hundred oersteds. Moreover, there is no problem even if the magneto-optic active layer is magnetically altered, so long as the information in the magnetic layer is not disturbed in the process. Because the information in the magnetic layer is thermomagnetically transferred back into the magneto-optic layer structure, any pattern in the magneto-optic active layer is overwritten. This is true whether the pattern was previously deliberately written, or unintentionally written at low level by the magnetic recording head.

Thus, other than spacing loss, the presence of the magneto-optic layer structure between the magnetic recording head and the magnetic recording layer does not have any significant degrading effect on either the magnetic recording or the performance of the magneto-optic layer structure. Depending on magneto-optic layer structure thickness and recording density, spacing loss due to the intervening magneto-optic layer structure is between about 3 and 7.5 dB. Although spacing loss is inherent and unavoidable, and conventional wisdom would militate against a structure which introduced such a loss, there are unexpected advantages which offset these losses.

Relative to the arrangement disclosed in U.S. Pat. No. 4,694,358, the advantages gained by the present configuration are as follows. In addition to the fact that the present invention allows the use of improved opaque substrates, such as aluminum, and the use of a double-sided configuration, magneto-optic recording structures according to the present invention have better magneto-optic readout performance resulting from the air incidence (as opposed to substrate incidence) of the read beam and the beam used for thermomagnetic transfer. A discussion of the advantages of air incidence appears in copending application U.S. Ser. No. 057,450 now abandoned, assigned to the assignee of the present disclosure, the contents of which are hereby incorporated by reference. While the above-referenced application relates to magneto-optic recording by means of a focussed beam incident on the recording surface through a window disk and across an air gap, the advantages with respect to signal-to-noise ratio discussed therein also apply to air incidence of the optical beam as in the present disclosure. The advantages for air incidence include:

1. Birefringence and polarization noise associated with transmission through the substrate are absent.
2. Noise due to scattering by microroughness of the substrate surface is reduced by a substantial factor due to the lower refractive index of the incident medium.
3. Antireflection coupling and Kerr effect due to the protective layer are enhanced because of the larger index mismatch and Fresnel coefficient at the air/dielectric interface as compared with the substrate/dielectric interface of a substrate incident optical beam.

In addition to the advantages discussed in Ser. No. 057,450, the problem of vertical birefringence of transmissive plastic molded substrates, particularly polycarbonate substrates, is avoided. Vertical birefringence in these substrates has been discussed recently in papers by Marchant (1986), *Proc. SPIE*, 695: 270–276 and by Yoshizawa et al (1986) *Proc. SPIE*, 695: 91–98.

All of these advantages largely offset the spacing losses so that signal-to-noise performance of magneto-optic recording structures according to the present invention is comparable to that of the invention described U.S. Pat. No. 4,694,358.

While the invention has been described with reference to a limited number of embodiments, it will be apparent to those skilled in the art that variations and modifications may be made without affecting the spirit and scope of the invention.

What is claimed is:

1. A magneto-optic recording structure comprising:
   a substrate;
   a first magnetic recording layer, for magnetically recording information by a magnetic head, coated on said substrate;
   a first magneto-optic layer structure coated on top of aid magnetic recording layer to which said magnetically recorded information is transferred optically from the magnetic recording layer when said magneto-optic layer structure is heated by a focussed laser beam of a first power, said transferred information being read out by irradiating a focussed laser beam of a second power lower than said first power to the medium, said magneto-optic layer structure comprising a first magneto-optical active layer, first and second dielectric layers provided on both sides of said magneto-optical active layer such that said first dielectric layer is coated on said magnetic recording layer and a reflective layer between said first dielectric layer and said magnetic recording layer.

2. The recording structure as claimed in claim 1, wherein said substrate is opaque.

3. The recording structure as claimed in claim 1, further comprising:
   a second magnetic recording layer coated on the other side of said substrate; and
   a second magneto-optic layer structure coated on said second magnetic recording layer.

4. The recording structure as claimed in claim 1 wherein said first magneto-optical active layer comprises an amorphous alloy of rare earth and transition metals having perpendicular anisotropy.

5. The recording structure as claimed in claim 4, wherein the rare earth elements of said first magneto-optical active layer are selected from the group consisting of gadolinium, terbium and dysprosium, and the transition metals are selected from the group consisting of iron, cobalt, and nickel.

6. The recording structure as claimed in claim 5, wherein said first magnetic recording layer is of chrome cobalt.

7. The recording structure as claimed in claim 1, wherein said first magnetic recording layer is adapted for vertical recording.

8. The recording structure as claimed in claim 1, wherein said first magnetic recording layer is adapted for longitudinal recording.

9. An information recording and playback device comprising:
   a magneto-optical recording medium comprising a substrate, a first magnetic recording layer coated on a first side of said substrate and a first magneto-optic layer structure comprising a first magneto-optical active layer, first and second dielectric layers provided on both sides of said magneto-optical active layer such that said first dielectric layer is coated on said magnetic recording layer and a reflective layer between said first dielectric layer and said magnetic recording layer;
   a magnetic recording head disposed adjacent said first magneto-optic layer structure for magnetically recording information in said first magnetic recording layer;
   means for providing a focussed laser beam of a first power that impinges on said first magneto-optical layer structure for heating said first magneto-optical layer structure and transferring said magnetically recorded information to the magneto-optical layer structure; and
   means for providing a focussed laser beam of a second power lower than said first power that impinges on said first magneto-optical layer structure for reading out said transferred information from a magneto-optical active layer of said magneto-optic layer structure.

10. The information recording and playback device as claimed in claim 9, wherein a second side of said substrate comprises a second magnetic recording layer and a second magneto-optical layer structure coated on said second magnetic recording layer.

* * * * *